Patented Apr. 27, 1948

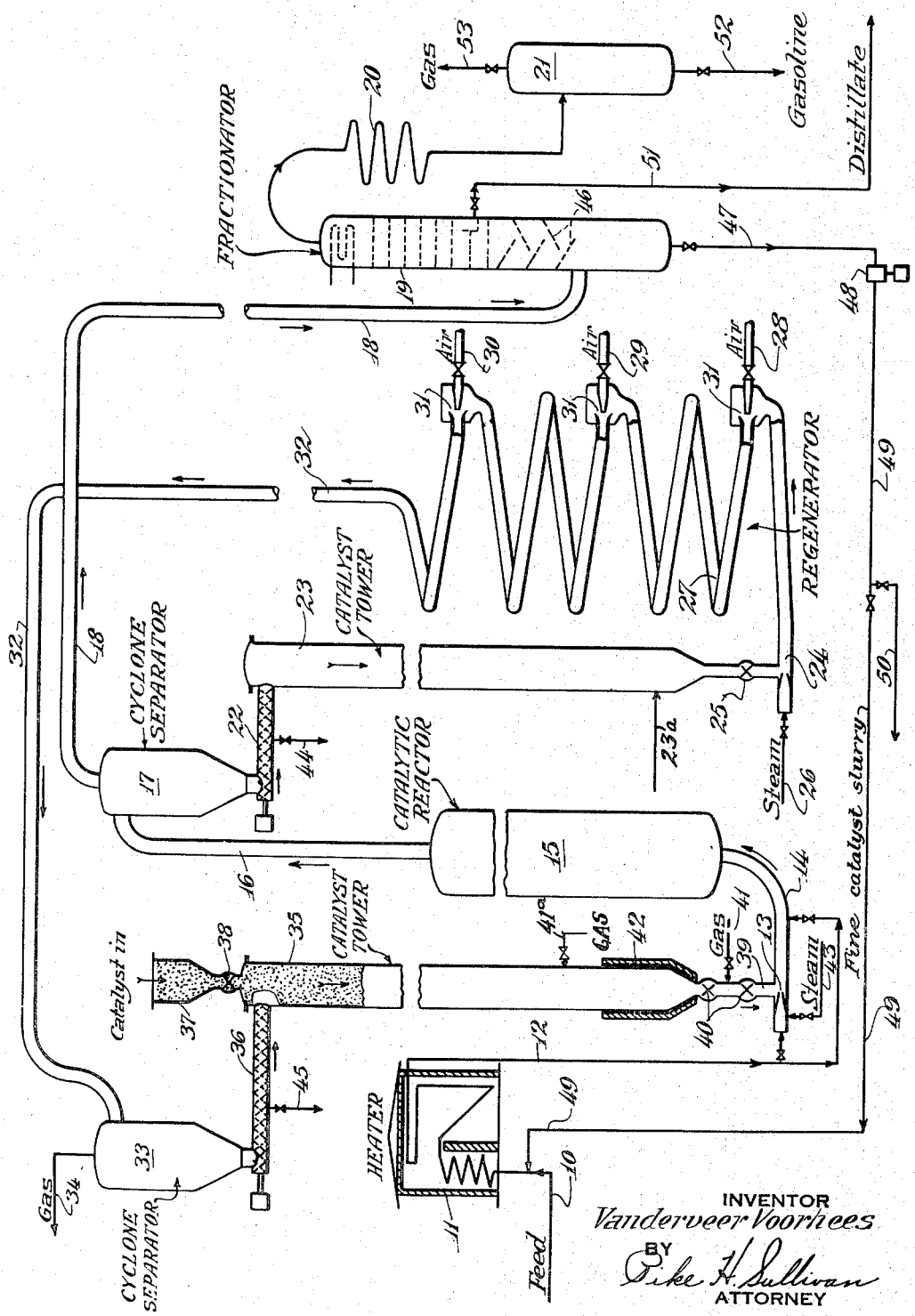

2,440,623

UNITED STATES PATENT OFFICE 2,440,623

TRANSFERRING FINELY DIVIDED SOLIDS

Vanderveer Voorhees, Hammond, Ind., assignor to Standard Oil Company, Chicago, Ill., a corporation of Indiana Application June 28, 1940, Serial No. 342,847

2 Claims. (Cl. 214—17)

This invention relates to the process of converting hydrocarbon oils and more particularly to the conversion of heavier hydrocarbon oils into gasoline motor fuels by catalytic conversion in the presence of a finely divided or powdered solid catalyst. One object of the invention is to provide a method and apparatus for continuously converting or cracking hydrocarbon oils such as gas oils by contacting the vapors thereof using a powdered solid catalyst which is thereafter regenerated and continuously recycled in the system. A more specific object of the invention is to provide a method of handling the powdered catalyst in the system with a minimum of disintegration by attrition and a minimum of abrasion by the catalyst of the apparatus employed. A still more specific object of the invention is to provide a method for recycling the powdered catalyst from zones of low pressure to zones of higher pressure without use of pumps or similar mechanical devices, employing instead a "hydrostatic" head of powdered catalyst to provide the desired pressure. Still other objects of the invention will become apparent as the description of the invention proceeds.

In the catalytic conversion of hydrocarbon oils employing powered catalyst, considerable difficulty has been encountered in the handling of the catalyst. Tremendous quantities of the catalyst must be handled considering that the amount of catalyst required usually exceeds the weight of the oil treated by several fold. For example, using an activated clay catalyst, it is commonly necessary to use 4 or 6 parts of catalyst to 1 part of oil and even as much as 10 parts of catalyst may be used to each part of oil treated. Catalysts employed for this purpose are commonly oxides of metals such as silicon, aluminum, chromium, magnesium and combinations of them. These metal oxides are often abrasive as are also the powdered cracking catalysts derived from natural sources such as activated kieselguhr, metal oxides, fuller's earth and other adsorbent earths as bentonite, wilkinite, etc. Various forms of finely divided silica are commonly used including silica gel impregnated with various promoters. These catalysts are in general quite abrasive and heretofore it has been found difficult to provide machinery for handling them in the large quantities necessary. Also, mechanical devices for pressuring and conveying catalysts often reduce much of the catalyst to such a fine state of subdivision that it is difficult to recover from the vapors and gases and consequently is lost from the system.

The most difficult problem has been to conduct the catalyst from zones of low pressure to zones of higher pressure in the conversion system. Mechanical devices provided for this purpose have required constant overhauling in addition to the fact that they often become clogged with the catalyst. In such mechanical devices operating against a pressure differential, it is necessary to maintain narrow clearances between metal surfaces substantially without lubrication of any kind because of the high temperature of the operations. On account of the large volume of catalyst necessary to be handled it is impossible to handle it in the form of slurries, because the amount of liquid required for this purpose would be prohibitive especially from the standpoint of heat balance in the conversion system.

I have now devised a method of handling powdered catalysts in the conversion system which obviates the diffiulties mentioned hereinabove. My invention is illustrated by a drawing which is a part of this specification and which shows diagrammatically an apparatus for carrying out the process. Referring to the drawing the hydrocarbon feed stock, which may be gas oil, kerosene, or, in the case of a reforming operation, heavy naphtha, is introduced into the system by line 10, through pipe heater 11 where it is vaporized and heated to a high conversion temperature usually in the range of 800 to 1050° F. It is desirable to employ only those feed stocks which are completely vaporizable inasmuch as the process is conducted substantially entirely in the vapor phase. From heater 11 the vapors pass by line 12 to mixer 13 where the vapors initially contact the powdered catalyst introduced at this point. The mixture of powdered catalyst and vapors passes at relatively high velocity through conduit 14 leading to reaction chamber 15 in which sufficient time is allowed for the desired catalytic conversion reaction to occur. In general it is desirable to conduct hydrocarbon vapors and powdered catalyst through the chamber 15 in an upward direction thereby increasing the length of time of contact of the powdered catalyst particles and the vapors as a result of the sedimentation of the catalyst particles under the influence of gravity. Reaction chamber 15 may be considerably elongated to increase the time allowed for sedimentation and various arrangements of baffles may be employed therein to prevent separation of catalyst.

It is usually desirable to maintain a temperature within chamber 15 of the order of 850 to 950° F. in the case of gas oil cracking and this may be obtained by supplying the vapor to the catalyst conductor 13 at a temperature considerably above the desired temperature in order to compensate for the cooling effect of the powdered catalyst introduced into the vapor stream. In the case of naphtha reforming, somewhat higher temperatures in the order of 975 to 1050° F. may be employed.

From chamber 15 the suspension of catalyst and partially converted hydrocarbon vapors is conducted by line 16 to cyclone separator 17 wherein substantially complete separation of catalyst from vapors is effected, the catalyst going to the bottom of the separator and the hydrocarbon vapors being conducted from the top of the separator by line 18 leading to fractionator 19, condenser 20 and gasoline receiver 21.

The catalyst separated in 17 is partially or almost entirely spent and must be regenerated for further use. To this end it is conveniently withdrawn from the separator by screw conveyor 22 or by a valve or flow regulating device and charged into the top of the standpipe 23. The flow of catalyst is regulated in such a manner that the standpipe is maintained largely filled with catalyst. Standpipe or tower 23 is sufficiently high to provide a column of catalyst which will develop sufficient "hydrostatic" pressure at the bottom of the tower to balance the back pressure in the regenerator inlet 24. The density of a typical powdered catalyst made from activated natural clay is about 0.4 to 0.65, thus requiring a catalyst column about 60 feet in height to provide a pressure of 30 pounds per square inch at the bottom. The low density is indicative of gas trapped in or added to the catalyst for example by aeration gas introduced through line 23a which facilitates its free flowing. The tower 23 should also be of sufficient diameter to avoid bridging of the catalyst therein. Higher pressure may be obtained by increasing the height of the towers from 100 to 150 feet or more and it is generally desirable to place the separator 17 above the tower 23 and conduct the catalyst up to the separator by suspension in a vapor stream as heretofore described, thereby providing gravity flow of the catalyst from the separator into the top of the tower. For catalysts having greater density, shorter towers may be employed. The catalyst will usually be supplied to the tower hot as received from the cracking reaction vessel and it may be maintained hot in tower 23 by suitable heat insulation, thereby facilitating ignition in the regeneration zone. The height of the catalyst column may be varied as desired, for example from 20 to 200 feet.

From the bottom of the tower 23 the catalyst is conducted through a suitable feeding mechanism 25 into regenerator inlet 24. Feeder 25 may be a star feeder rotating at sufficient speed to introduce the catalyst into the regenerator at the desired constant rate. At the point of introduction into the regenerator it is desirable to disperse the catalyst in an inert gas, for example superheated steam which may be introduced by line 26. The suspension of catalyst in inert vapor is conducted through regenerator coil 27 and oxidizing gas, for example, air is introduced into the regenerator by lines 28, 29 and 30. The oxidizing gas employed for this purpose may be air which has been diluted with an inert gas, for example flue gas, to a point where the oxygen concentration is greatly reduced, e. g., to about 0.5 to 5% of oxygen. It is preferred to introduce gas of low oxygen concentration by line 28 and increase the oxygen concentration in the gas introduced by line 29 and line 30. In fact it is usually desirable to add the oxidizing gas at numerous points increasing the oxygen concentration progressively until finally undiluted air is introduced.

It is preferred to introduce the oxidizing gas into the regenerator 27 through nozzles or Venturi devices arranged to assist the movement of the catalyst and gases through the regenerator, thereby reducing the pressure at the regenerator inlet 24. Venturi devices for this purpose are indicated in the drawing by numeral 31. Air is introduced through them at high velocity from lines 28, 29 and 30. The regenerator 27 is suitably arranged in the form of a coil providing an elongated passage for the catalyst and gases. During the regeneration, considerable heat is evolved in the combustion of carbonaceous matter in the used catalyst, and means are provided for dissipating the heat and controlling the temperature of the catalyst undergoing regeneration. It is important to prevent the temperature from going too high otherwise causing damage to the catalyst, apparently as a result of excessive dehydration, sintering, agglomeration or other phenomena. Synthetic catalysts are generally less sensitive to heat. Some catalysts, for example t e activated clays, usually exhibit a loss in activity when heated appreciably above 1000° F. and even at somewhat lower temperatures, especially on long recycling. Other catalysts, for example the activated silica gels, will frequently withstand temperatures considerably higher than this. Thus temperatures of 1200 to 1400° F. may be permitted for short periods of time although it is generally desirable to avoid temperatures as high as this. In catalyst regeneration it is difficult to obtain uniform temperatures, and higher average temperatures are permissible where great uniformity in temperature is achieved. Local overheating of the catalyst resulting from excessive oxygen concentrations at certain points in the course of the catalyst stream should be avoided and this may be accomplished by introducing the regenerating gas at numerous points and in sufficient dilution. It is also desirable to introduce the regenerating gas at high velocity through jets as indicated by the construction of the Venturi mixers 31, thus attaining high turbulence. The temperature of the regenerator 27 may be controlled by suitable ventilation, but more uniform temperature control is possible by using a liquid temperature regulating bath circulating around the coils of the regenerator. For this purpose a bath consisting of a molten metal, lead, alloys or molten salts for example, sodium nitrate and mixtures of sodium nitrate with other salts may be employed. The bath may be circulated to and from suitable heat exchangers where the temperature is controlled by abstracting heat, and in the latter case heat may be abstracted by water which is converted into steam which may be used for the production of power used in the process.

From regenerator 27 the suspension of catalyst and gases containing a small amount of oxygen is conducted by line 32 to cyclone separator 33 wherein the catalyst is separated from the gases and falls to the bottom and the gases carrying a small amount of catalyst dust are eliminated from the separator by outlet 34 and may be rejected from the system. If it is desired to recover the small amount of catalyst lost in this way it may be done by various methods, for example by passing the gases through an electrical precipitator, a bag filter or a suitable scrubber. A water scrubber may be used for this purpose and the recovered catalyst may be dried and reintroduced into the system. An oil scrubber may be charged with a portion of the feed stock undergoing conversion. The resulting oil-catalyst suspension or slurry may be charged to the furnace 11. A portion of the heat carried by the regeneration gases in the line 32 may be utilized for the production of steam or for other purposes by suitable heat exchange means.

The regenerated catalyst from separator 33 is charged to the top of catalyst tower 35 for which purpose a screw type feeder 36 may be employed. The feeder may be eliminated if desired by mounting the separator 33 directly above the tower. Tower 35 resembling tower 23 is likewise maintained substantially full of catalyst in order to obtain the maximum "hydrostatic" head in the tower. Fresh catalyst may be introduced into the system from hopper 37 controlled by star valve 38. Tower 35, usually 50 to 100 feet high or more, permits building up a "hydrostatic" pressure of the catalyst at the bottom thereof. The base of the tower is connected by line 39 to contactor 13 and it is usually advisable to maintain a vestibule at the base of the tower 35, for example by star feeders 40 in line 39. As these feeders 40 are operated simultaneously a uniform catalyst flow is provided which may be regulated as desired. Instead of star feeders I may use worm conveyors, screw pumps or similar devices which operate satisfactorily when powdered material is supplied to them under pressure. Introduction of an inert gas such as flue gas by line 41 serves to prevent any oxygen-containing gas passing from the tower 35 into the conversion chamber 15, the gas acting as a seal for the catalyst in the tower 35. The gas seal also prevents oil vapors reaching the catalyst in 35 and condensing therein. Any slight excess of flue gas introduced in this way is passed through feeder 36 and into separator 33 whence it is eliminated from the system by line 34. Additional inert gas may be charged by line 41a directly to the tower 35 for the purpose of "gassing" or "aerating" the catalyst and facilitating its flow.

By properly heat insulating catalyst tower 35 the catalyst may be supplied to the mixer 13 in heated condition. When this is not successful I may avoid too great a temperature drop occurring on mixing the catalyst with the oil vapors by suitably heating the catalyst in the base of tower 35 before mixing with the oil. For example, an electric heater may be applied in the base of the tower as indicated by 42. The entire tower and cyclone 33 may be maintained at a relatively high temperature level in order to supply by means of the catalyst a substantial part of the heat required for cracking. Instead of electric heat a gas fired furnace or super heated steam coils may be used for the purpose.

In carrying out my process it is desirable to prevent liquid from entering the catalyst towers 23 and 35 as liquid would generally tend to cake the catalyst and prevent its free flowing. Therefore, in starting up the process the reaction chamber 15 and separator 17 are heated above the condensation point of the hydrocarbon vapors before introducing oil into the system which may conveniently be done by introducing super heated steam or other hot inert gas through line 43. Hot spent regenerating gases from separator 33 of an adjacent operating unit may be used for the purpose. Any liquids condensing in the separators 17 and 33 during the primary heating up of the unit may be withdrawn through drain connections 44 and 45, respectively.

The extent of conversion of heavier hydrocarbons into gasoline occurring in the process usually varies from about 25 to 40% although conversions as high as 50 to 60% may be obtained under some conditions with certain types of feed stock, particularly with the more paraffinic oils and the waxes. The converted vapors in line 18 will usually carry with them in suspension a small amount of catalyst in very fine form and this may be separated in the base of fractionator 19 by contacting with reflux liquid flowing over suitable baffle plates 46. The slurry of catalyst and oil thereby obtained may be withdrawn by line 47 and pump 48 by which it may be recycled to heater 11 by line 49 or discharged from the system by line 50. When discharged from the system it may, if desired, be separated by filtration or otherwise and the recovered catalyst may be returned to the system. If desired a distillate boiling substantially above gasoline may be trapped out of the fractionator 19 by line 51. Gasoline withdrawn from receiver 21 by line 52 may be subjected to suitable stabilization to remove propane and other undesirable fixed gases therefrom. Likewise the gases withdrawn from receiver 21 by line 53 may be processed to recover gasoline vapors contained therein.

The pressures employed in my process will usually be low. Atmospheric pressure may be maintained in separators 17 and 33 whereas the pressure in the catalyst contact zone 13 and at the inlet of the regenerator 24 may be of the order of 10–30 pounds per square inch or even as high as 50–60 pounds per square inch. When employing a reaction chamber to provide the necessary catalyst contacting time such as reaction chamber 15 the pressure at the contacting point 13 is usually lower than the pressure at the entrance of regenerator 27. In this case the catalyst feeding tower 35 may be much shorter than the catalyst tower 23. However, I may employ a tubular contacting zone in place of chamber 15 in which case the pressure at the contacting point 13 will be considerably higher and commensurate with the pressure at the entrance to regenerator 27. In general, sufficient head of catalyst should be maintained to overcome the pressure differential between the catalyst separators 17 and 33 and the dispersing zones 13 and 24.

Besides the simplicity of construction and operation of my powdered catalyst cracking process it has the advantage of avoiding the production of extremely fine particles of catalyst which are difficult to recover from the tremendous volume of vapors and gases handled. Degradation of the catalyst by mechanical attrition is reduced to a minimum as a result of which I obtain numerous advantages from the use of catalyst particles of uniform size, uniform reaction velocity, uniform sedimentation rate, etc. Whenever used in this application, the term "hydrostatic" as applied to the powdered catalyst mass has the same meaning that it would have if applied to a true liquid.

Having thus described my invention what I claim is:

1. A method of transferring finely divided particles of solid material in a system between confined zones maintained under different gaseous pressures which comprises maintaining a vertically extending manometric column of the particles in communication with the zone of higher pressure at its lower end and in communication with the zone of lower pressure at its upper end, introducing an aerating gas into said column of solid particles in amount adapted to maintain the particles in a pseudo-liquid phase, the height of said column being such that it will exert a pseudo-hydrostatic pressure approximating the difference between the pressures of the two zones, and introducing the particles of solid material from one of said zones into said column at the end in communication therewith to displace solid material from the other end of said column into the other of said zones.

2. A method of transferring finely divided particles of solid catalytic material in a catalytic system between confined zones maintained under different gaseous pressures which comprises maintaining a vertically extending manometric column of the particles in communication with the zone of higher pressure at its lower end and in communication with the zone of lower pressure at its upper end, introducing an aerating gas into said column of solid particles in amount adapted to maintain the particles in a pseudo-liquid phase, the height of said column being such that it will exert a pseudo-hydrostatic pressure approximating the difference between the pressures of the two zones, and introducing the particles of solid catalytic material from one of said zones into said column at the end in communication therewith to displace solid material from the other end of said column into the other of said zones.

VANDERVEER VOORHEES.

REFERENCES CITED

The following references are of record in the file of this patent:

UNITED STATES PATENTS

| Number | Name | Date |
|---|---|---|
| 727,030 | Tilghman, Jr. | May 5, 1903 |
| 1,180,217 | White | Apr. 18, 1916 |
| 1,390,974 | Von Porat | Sept. 13, 1921 |
| 1,773,180 | Herthel et al. | Aug. 19, 1930 |
| 1,799,858 | Miller | Apr. 7, 1931 |
| 1,887,047 | Smith et al. | Nov. 8, 1932 |
| 1,984,380 | Odell | Dec. 18, 1934 |
| 2,000,672 | Stratford et al. | May 7, 1935 |
| 2,121,258 | Osterstrom et al. | June 21, 1938 |
| 2,216,470 | Forney | Oct. 1, 1940 |
| 2,231,231 | Subkow | Feb. 11, 1941 |
| 2,231,424 | Huppke | Feb. 11, 1941 |
| 2,247,126 | Hemminger | June 24, 1941 |
| 2,248,196 | Plummer | July 8, 1941 |
| 2,253,486 | Belchetz | Aug. 19, 1941 |

FOREIGN PATENTS

| Number | Country | Date |
|---|---|---|
| 533,037 | Germany | Sept. 8, 1931 |